United States Patent
Liu et al.

(10) Patent No.: US 8,817,193 B2
(45) Date of Patent: Aug. 26, 2014

(54) METHOD AND APPARATUS FOR HIDING CAPTION WHEN DISPLAYING VIDEO IMAGE

(71) Applicant: Tencent Technology (Shenzhen) Company Limited, Shenzhen (CN)

(72) Inventors: Jun Liu, Shenzhen (CN); Qiang Dai, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/147,728

(22) Filed: Jan. 6, 2014

(65) Prior Publication Data

US 2014/0118621 A1   May 1, 2014

Related U.S. Application Data

(63) Continuation-in-part of application No. PCT/CN2012/076257, filed on May 30, 2012.

(30) Foreign Application Priority Data

Jul. 5, 2011   (CN) .......................... 2011 1 0186409

(51) Int. Cl.
- *G06F 21/30* (2013.01)
- *H04N 9/74* (2006.01)
- *H04N 5/445* (2011.01)
- *H04N 21/431* (2011.01)

(52) U.S. Cl.
CPC ............. *H04N 5/445* (2013.01); *H04N 21/431* (2013.01)
USPC ........................... 348/589; 345/636; 434/169

(58) Field of Classification Search
USPC ................. 348/588, 564, 569, 578, 589, 468; 345/629, 632–634, 636, 639–641; 434/156, 169, 176, 178, 307 R; 704/3, 704/277
See application file for complete search history.

(56) References Cited

U.S. PATENT DOCUMENTS

| 5,134,479 A | * | 7/1992 | Ohishi ......................... 348/556 |
| 5,323,235 A | * | 6/1994 | Tonomura et al. ............ 348/445 |
| 5,486,872 A | | 1/1996 | Moon |

(Continued)

FOREIGN PATENT DOCUMENTS

| CN | 1949841 A | 4/2007 |
| CN | 101420556 A | 4/2009 |
| JP | 63003574 A | 1/1988 |
| WO | 2010/059193 A1 | 5/2010 |

OTHER PUBLICATIONS

International Search Report for International Patent Application No. PCT/CN2012/076257, dated Sep. 13, 2012, and English translation thereof.

*Primary Examiner* — Victor Kostak
(74) *Attorney, Agent, or Firm* — Harness, Dickey & Pierce, P.L.C.

(57) ABSTRACT

A method and apparatus for hiding a caption when displaying a video image. Hiding area information is acquired. According to the hiding area information, a hiding area is acquired. Hiding time period information is acquired. A preconfigured image in the hiding area of a video image is displayed in the hiding time period when the video image is displayed. By applying the technical solution according various embodiments, an external caption and an embedded caption can be hid flexibly.

9 Claims, 3 Drawing Sheets

(56) References Cited

U.S. PATENT DOCUMENTS

| | | | |
|---|---|---|---|
| 5,572,260 A * | 11/1996 | Onishi et al. | 348/460 |
| 6,243,419 B1 * | 6/2001 | Satou et al. | 375/240.13 |
| 2002/0007371 A1 * | 1/2002 | Bray | 707/501.1 |
| 2008/0281579 A1 * | 11/2008 | Tsukiji et al. | 704/3 |
| 2009/0055189 A1 * | 2/2009 | Stuart et al. | 704/270 |
| 2009/0172724 A1 * | 7/2009 | Ergen et al. | 725/32 |
| 2010/0029294 A1 * | 2/2010 | Matsuoka | 455/456.1 |
| 2012/0130720 A1 * | 5/2012 | Suda | 704/276 |

* cited by examiner

METHOD AND APPARATUS FOR HIDING CAPTION WHEN DISPLAYING VIDEO IMAGE

CROSS-REFERENCE TO RELATED APPLICATIONS

This application is a continuation-in-part of International Application No. PCT/CN2012/076257 filed on May 30, 2012. This application claims the benefit and priority of Chinese Patent Application No. 201110186409.3, filed Jul. 5, 2011. The entire disclosures of each of the above applications are incorporated herein by reference.

FIELD

The present disclosure relates to video image techniques and to a method and apparatus for hiding a caption when displaying a video image.

BACKGROUND

This section provides background information related to the present disclosure which is not necessarily prior art.

At present, with growth of user's requirements for video images, captions in the video images are used more and more widely.

For example, users studying English need to hide all or part of English captions during the process of studying English through videos, so as to test their understanding of English. For family users, during the process of displaying videos, it is necessary to shield sensitive vocabularies for minors.

At present, there are two manners for displaying the captions, i.e., external captions and embedded captions. For the external captions, the external captions files are separate from video files. The external captions are imported when videos are displayed. For the embedded captions, embedded caption files have already been integrated into video files. Content of the embedded captions are included in the video files, and are not split from the video files.

At present, there are two methods widely used for shielding a caption, wherein the methods for shielding a caption are also called as methods for hiding a caption. A first method is to adopt "hiding" setting option provided by video displaying software. Main shortcomings of the method include: 1) the method is only for the external captions; 2) a time period in which the captions are hid can not be selected flexibly, and users have to handoff "displaying/hiding" setting option repeatedly when the captions need to be hid in a part of time; 3) a part of the external captions includes two languages, if it is set to hide the captions, it may be not implemented to only hide one of the two languages. A second method is to hide the captions by editing the files of the external captions manually. Characters to be hid are deleted from the files of the external captions, so as to implement hiding the captions. Main shortcoming of this method include: 1) the method is only for the external captions; 2) because there are varieties of formats of the external files (such as ssa, ass, srt, and so on), the users need to edit each variety of the external captions, and handle each variety of the external captions differently; 3) the captions hiding cannot be adjusted dynamically, thus, user's requests cannot be responded to in time; and 4) when users need to display the hid captions, the captions files which have already been deleted need to be re-edited.

It can be seen from the above that conventional methods for hiding a caption are only for external captions, and cannot implement hiding captions flexibly.

SUMMARY

This section provides a general summary of the disclosure, and is not a comprehensive disclosure of its full scope or all of its features.

A method and apparatus for hiding a caption when displaying a video image are provided according to various embodiments. Thus, an external caption and an embedded caption can be hid flexibly.

In order to achieve the above intention, the technical solution can be implemented according to various embodiments as follows:

A method for hiding a caption when displaying a video image, which includes:
  acquiring hiding area information, acquiring a hiding area according to the hiding area information;
  acquiring hiding time period information; and
  displaying a preconfigured image in the hiding area of a video image in the hiding time period when the video image is displayed.

An apparatus for hiding a caption when displaying a video image, which includes:
  a hiding area acquiring module, to acquire hiding area information, acquire a hiding area according to the hiding area information;
  a hiding time period acquiring module, to acquire hiding time period information; and
  an image displaying module, to display a preconfigured image in the hiding area of a video image in the hiding time period when the video image is displayed.

The method and apparatus provided according to various embodiments can perform real-time acquisition of the hiding area information and the hiding time period information and display the preconfigured image in the hiding area of the video image in the hiding time period when the video image is displayed. Thus, content of the caption can be hid. The technical solution according to various embodiments can be implemented flexibly and can apply to the external caption and the embedded caption.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Examples of the present disclosure is described in detail as follows, taken in conjunction with the accompanying drawings, so as to make the above and additional aspects and advantages of the disclosure clearer for those skilled in the art.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Figure 1:
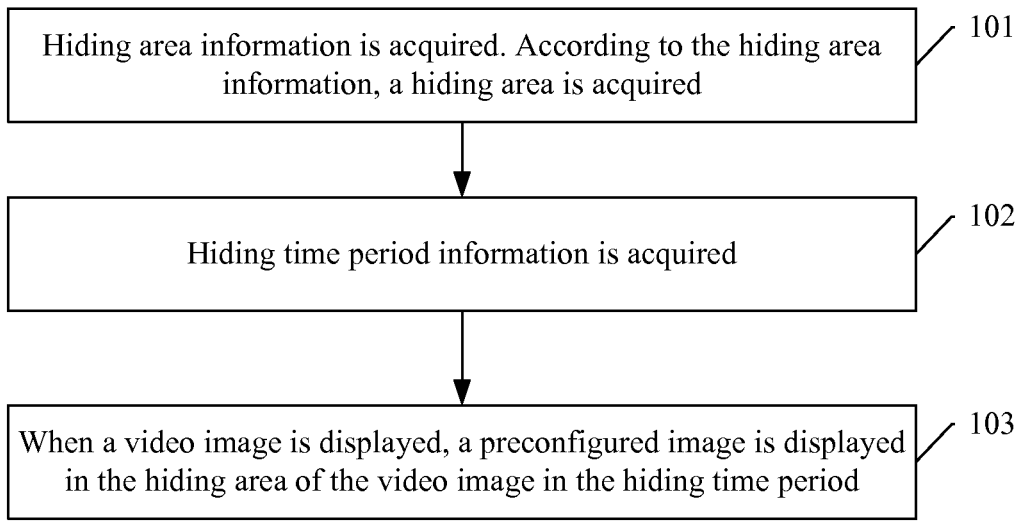
FIG. 1 is a flowchart illustrating a method for hiding a caption when displaying a video image according to various embodiments.

A method for hiding a caption when displaying a video image is provided according to various embodiments. FIG. 1 is a flowchart illustrating a method for hiding a caption when displaying a video image according to various embodiments.

The method may be implemented by such as a terminal device. The terminal device may be a mobile terminal such as a mobile phone, a smartphone, a notebook computer, a tablet PC, iPad and so on. In addition, the terminal device may also be a stationary terminal such as a desktop computer, a server and so on.

At block 101, hiding area information is acquired. According to the hiding area information, a hiding area is acquired.

At block 102, hiding time period information is acquired.

At block 103, when a video image is displayed, a preconfigured image is displayed in the hiding area of the video image in the hiding time period.

Figure 2:
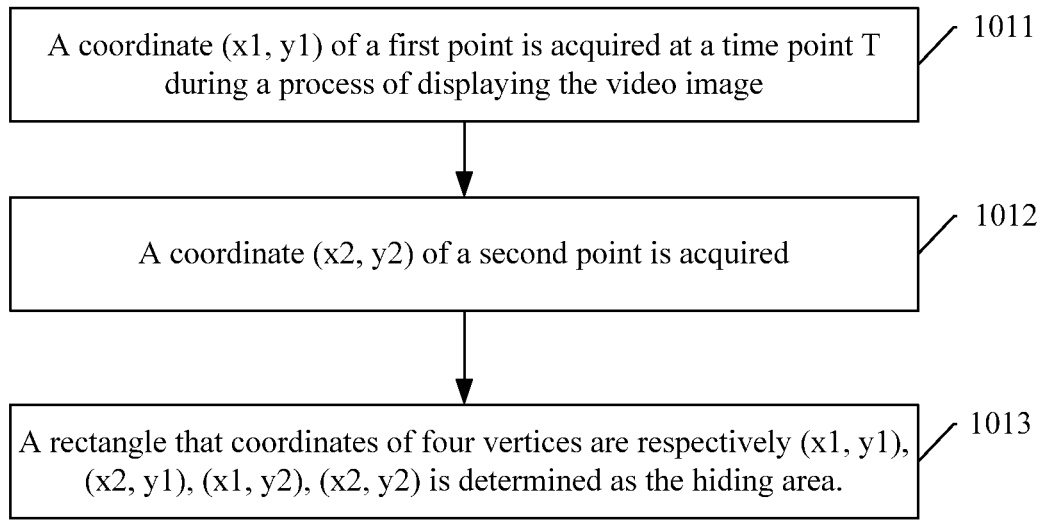
FIG. 2 is a flowchart illustrating a method for acquiring hiding area information according to various embodiments.

At block 101, acquiring the hiding area information, acquiring the hiding area information according to the hiding area information may include the following operations as shown in FIG. 2:

At block 1011, a coordinate (x1, y1) of a first point is acquired at a time point T during a process of displaying the video image, wherein the first point is configured by a user and is used to determine the hiding area.

For example, if it is monitored that the user presses a left mouse button at a point of the video image or touches the point of the video image on the touchscreen, the point is determined as the first point that is configured by the user and is used to determine the hiding area. The coordinate (x1, y1) of the point is acquired.

At block 1012, a coordinate (x2, y2) of a second point is acquired, wherein the second point is configured by the user and is used to determine the hiding area.

In various embodiments, if it is monitored that after the user presses the left mouse button and drags a mouse and releases the pressed left mouse button until the mouse is dragged to another point, the another point is determined as the second point which is configured by the user and is used to determine the hiding area. The coordinate (x2, y2) of the point is acquired.

In various embodiments, if it is monitored that after the user touch the point of the video image on the touchscreen and moves the touching point and interrupts the touch at another point of the video image on the touchscreen, the another point is determined as the second point which is configured by the user and is used to determine the hiding area. The coordinate (x2, y2) of the point is acquired.

At block 1013, a rectangle that coordinates of four vertices are respectively (x1, y1), (x2, y1), (x1, y2), (x2, y2) is determined as the hiding area.

Figure 3:
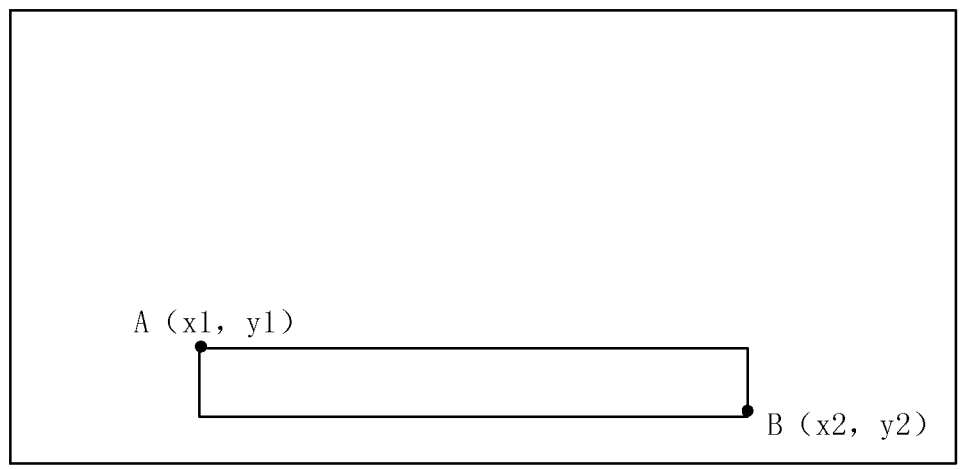
FIG. 3 is a schematic diagram illustrating a hiding area selected by a user according to various embodiments.

FIG. 3 is a schematic diagram illustrating a hiding area selected by a user according to various embodiments. As shown in FIG. 3, a point A is the first point which is configured by the user and used to determine the hiding area. A point B is the second point which is configured by the user and used to determine the hiding area. The hiding area is a rectangle a diagonal of which is a line AB.

At block 102, acquiring the hiding time period information may include: receiving a start time point and an end time point of the hiding time period respectively input by the user. This way can apply to an external caption and an embedded caption.

For the external caption, acquiring the hiding time period information at block 102 may also include determining a time point at which the user configures the first point used to determine the hiding area, i.e., the time point T at block 1011, determining content of the caption displayed at this time point, reading an external caption file, acquiring a start time point and an end time point of displaying the content of the caption, configuring the start time point and the end time point as the hiding time period information. For example, the user presses the left mouse button at the time point 00:00:11 to determine the point A. The content of the caption at the time point 00:00:11 is "XXXXXX". The external caption file is read, which includes information as follows:

"00:00:10,812->00:00:12,144

XXXXXX",

The start time point and the end time point of displaying the content of the caption "XXXXXX" are respectively 00:00:10,812 and 00:00:12,144, which are the hiding time period. Certain text sentence in the caption can be hid conveniently according to user's selection in this way.

After operations at blocks 101 and 102 are respectively performed, operations at block 103 are performed. The preconfigured image is displayed in the hiding area of the video image in the hiding time period. For example, each pixel dot in the hiding area is displayed as a predetermined same color, to cover a previous caption. In an embodiment, each frame of the video image in the hiding time period may be determined. The hiding area in each frame is displayed as the predetermined image.

Figure 4:
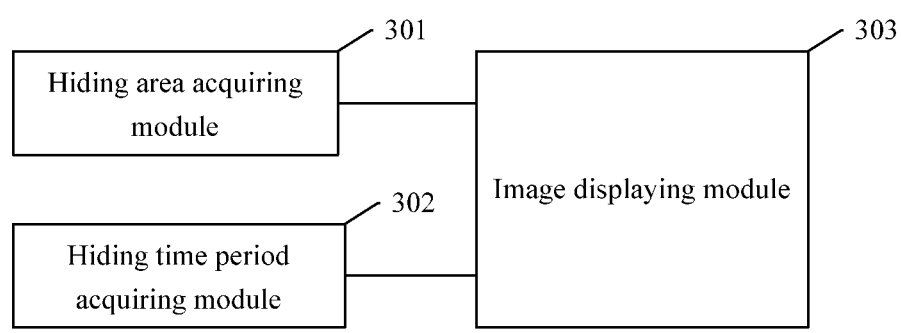
FIG. 4 is a schematic diagram illustrating a structure of an apparatus for hiding a caption when displaying a video image according to various embodiments.

An apparatus for hiding a caption when displaying a video image is also provided according to various embodiments. FIG. 4 is a schematic diagram illustrating a structure of an apparatus for hiding a caption when displaying a video image. The apparatus includes:

a hiding area acquiring module 301, to acquire hiding area information, acquire a hiding area according to the hiding area information;

a hiding time period acquiring module 302, to acquire hiding time period information;

an image displaying module 303, to display a preconfigured image in the hiding area of a video image in the hiding time period when the video image is displayed.

Specifically, the hiding area acquiring module 301 is to acquire a coordinate (x1, y1) of a first point that is configured by a user and is used to determine the hiding area, acquire a coordinate (x2, y2) of a second point that is configured by the user and is used to determine the hiding area; and determine a rectangle as the hiding area, wherein coordinates of four vertices of the rectangle are respectively (x1, y1), (x2, y1), (x1, y2), (x2, y2).

The hiding time period acquiring module 302 is to receive a start time point and an end time point of the hiding time period respectively input by the user.

Alternatively, for an external caption, the hiding time period acquiring module 302 is to determine a time point at which the user configures the first point used to determine the hiding area, determine content of the external caption displayed at the time point, read an external caption file, acquire a start time point and an end time point of displaying the content of the external caption, and configure the start time point and the end time point as the hiding time period information.

The image displaying module 303 is to determine each frame of the video image in the hiding image, display the predetermined image in the hiding area in each frame.

Figure 5:
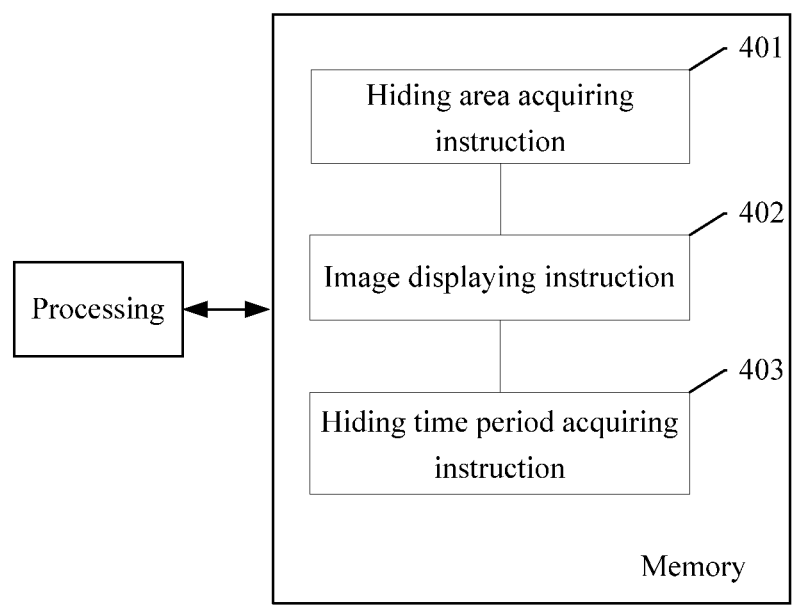
FIG. 5 is a schematic diagram illustrating a structure of an apparatus for hiding a caption when displaying a video image according to various embodiments.

An apparatus for hiding a caption when displaying a video image is provided according to various embodiments. FIG. 5 is a schematic diagram illustrating a structure of an apparatus for hiding a caption when displaying a video image. A processor for executing instructions stored in a memory, the instructions includes:

a hiding area acquiring instruction 401, to acquire hiding area information, acquire a hiding area according to the hiding area information;

a hiding time period acquiring instruction 403, to acquire hiding time period information;

an image displaying instruction 402, to display a preconfigured image in the hiding area of a video image in the hiding time period when the video image is displayed.

Specifically, the hiding area acquiring instruction 401 is to acquire a coordinate (x1, y1) of a first point that is configured by a user and is used to determine the hiding area, acquire a coordinate (x2, y2) of a second point that is configured by the user and is used to determine the hiding area; and determine a rectangle as the hiding area, wherein coordinates of four vertices of the rectangle are respectively (x1, y1), (x2, y1), (x1, y2), (x2, y2).

The hiding time period acquiring instruction 403 is to receive a start time point and an end time point of the hiding time period respectively input by the user.

Alternatively, for an external caption, the hiding time period acquiring instruction 403 is to determine a time point at which the user configures the first point used to determine the hiding area, determine content of the external caption displayed at the time point, read an external caption file, acquire a start time point and an end time point of displaying the content of the external caption, and configure the start time point and the end time point as the hiding time period information.

The image displaying instruction 402 is to determine each frame of the video image in the hiding image, display the predetermined image in the hiding area in each frame.

A computer readable storage medium for storing a computer program is provided according to various embodiments. The computer program including instructions to execute the following procedure:

acquire hiding area information, acquire a hiding area according to the hiding area information;

acquire hiding time period information;

display a preconfigured image in the hiding area of a video image in the hiding time period when the video image is displayed.

The computer program includes instructions to execute the following procedure:

acquire a coordinate (x1, y1) of a first point that is configured by a user and is used to determine the hiding area, acquire a coordinate (x2, y2) of a second point that is configured by the user and is used to determine the hiding area; and determine a rectangle as the hiding area, wherein coordinates of four vertices of the rectangle are respectively (x1, y1), (x2, y1), (x1, y2), (x2, y2).

The computer program includes instructions to execute the following procedure: receive a start time point and an end time point of the hiding time period respectively input by the user.

The computer program includes instructions to execute the following procedure: for an external caption, determine a time point at which the user configures the first point used to determine the hiding area, determine content of the external caption displayed at the time point, read an external caption file, acquire a start time point and an end time point of displaying the content of the external caption, and configure the start time point and the end time point as the hiding time period information.

The computer program includes instructions to execute the following procedure: determine each frame of the video image in the hiding image, display the predetermined image in the hiding area in each frame.

The storage medium for providing the computer program may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the computer program may be downloaded from a server computer via a communication network.

The method and the apparatus is provided according to various embodiments. According to the method and the apparatus, the caption can hid according to the user's selection. The method and the apparatus can apply to the external caption and the embedded caption. The content of the caption to be hid and the time in which the caption is to be hid can be selected flexibly. Furthermore, a user's request can be responded to in time. Accordingly, dynamic adjustment may be performed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for hiding a caption when displaying a video image, comprising:

acquiring hiding area information, acquiring a hiding area according to the hiding area information;

acquiring hiding time period information; and displaying a preconfigured image in the hiding area of a video image in the hiding time period when the video image is displayed;

wherein acquiring the hiding time period information comprises:

determining a time point at which the user configures the first point used to determine the hiding area, and determining content of an external caption displayed at the time point;

reading an external caption file, acquiring a start time point and an end time point of displaying the content of the external caption, configured in the start time point and the end time point as the hiding time period information.

2. The method according to claim 1, wherein the acquiring the hiding area information comprises:
- acquiring a coordinate (x1, y1) of a first point configured by a user and is used to determine the hiding area;
- acquiring a coordinate (x2, y2) of a second point that is configured by the user and is used to determine the hiding area; and
- determining a rectangle as the hiding area, wherein coordinates of four vertices of the rectangle are respectively (x1, y1), (x2, y1), (x1, y2), (x2, y2).

3. The method according to claim 1, wherein acquiring the hiding time period information comprises:
- receiving a start time point and an end time point of the hiding time period respectively inputted by the user.

4. The method according to claim 1, wherein displaying the preconfigured image in the hiding area of the video image in the hiding time period comprises:
- determining each frame of the video image in the hiding image, displaying the predetermined image in the hiding area in each frame.

5. An apparatus for hiding a caption when displaying a video image, comprising:
- a hiding area acquiring module, to acquire hiding area information, acquire a hiding area according to the hiding area information;
- a hiding time period acquiring module, to acquire hiding time period information;
- an image displaying module, to display a preconfigured image in the hiding area of a video image in the hiding time period when the video image is displayed;
- wherein for an external caption, the hiding time period acquiring module is to determine a time point at which the user configures the first point used to determine the hiding area, determine content of the external caption displayed at the time point, read an external caption file, acquire a start time point and an end time point of displaying the content of the external caption, and configure the start time point and the end time point as the hiding time period information.

6. The apparatus according to claim 5, wherein the hiding area acquiring module is to acquire a coordinate (x1, y1) of a first point that is configured by a user and is used to determine the hiding area, acquire a coordinate (x2, y2) of a second point that is configured by the user and is used to determine the hiding area; and determine a rectangle as the hiding area, wherein coordinates of four vertices of the rectangle are respectively (x1, y1), (x2, y1), (x1, y2), (x2, y2).

7. The apparatus according to claim 5, wherein the hiding time period acquiring module is to receive a start time point and an end time point of the hiding time period respectively inputted by the user.

8. The apparatus according to claim 5, wherein the image displaying module is to determine each frame of the video image in the hiding image, and display the predetermined image in the hiding area in each frame.

9. A non-transitory computer readable storage device for storing a computer program, the computer program comprising instructions to execute the following procedure, comprising:
- acquire hiding area information, acquire a hiding area according to the hiding area information;
- acquire hiding time period information; and
- display a preconfigured image in the hiding area of a video image in the hiding time period when the video image is displayed:
- wherein acquiring the hiding time period information comprises:
- determining a time point at which the user configures the first point used to determine the hiding area, and determining content of an external caption displayed at the time point;
- reading an external caption file, acquiring a start time point and an end time point of displaying the content of the external caption, configuring the start time point and the end time point as the hiding time period information.

* * * * *